United States Patent [19]
Morin et al.

[11] Patent Number: 5,154,107
[45] Date of Patent: Oct. 13, 1992

[54] METHOD FOR ADJUSTING THE LOST MOTION IN A TANDEM MASTER CYLINDER AND TANDEM MASTER CYLINDER FOR CARRYING OUT THIS METHOD

[75] Inventors: Gérard Morin, Conde Saint Libiaire; Francois Gaffé, Drancy, both of France

[73] Assignee: Bendix Europe Services Techniques, Drancy, France

[21] Appl. No.: 731,606

[22] Filed: Jul. 17, 1991

[30] Foreign Application Priority Data

Aug. 2, 1990 [FR] France .................. 90 09891

[51] Int. Cl.⁵ ............................................. F01B 31/14
[52] U.S. Cl. ........................... 92/13.3; 92/13.6; 60/588
[58] Field of Search ............ 60/533, 547.1, 546, 60/588, 562; 92/13.8, 13.3, 13.6

[56] References Cited

U.S. PATENT DOCUMENTS

| | | | |
|---|---|---|---|
| 4,453,380 | 6/1984 | Meynier | 60/534 |
| 4,815,293 | 3/1989 | Cadeddu | 92/13.8 |
| 5,014,515 | 5/1991 | Reinartz et al. | 60/588 |
| 5,036,751 | 8/1991 | Seip et al. | 60/533 |

FOREIGN PATENT DOCUMENTS

| | | |
|---|---|---|
| 0075505 | 3/1083 | European Pat. Off. |
| 3424513 | 1/1986 | Fed. Rep. of Germany . |
| 3819737 | 12/1989 | Fed. Rep. of Germany . |
| 0050843 | 5/1981 | Japan ........................ 60/562 |
| 2075631 | 11/1981 | United Kingdom ......... 60/562 |

*Primary Examiner*—Thomas E. Denion
*Attorney, Agent, or Firm*—Larry J. Palguta; Ken C. Decker

[57] ABSTRACT

The tandem master cylinder comprises, in a bore, a primary piston defining with a secondary piston a primary chamber, the secondary piston defining with the bottom of the bore a secondary chamber, the primary and secondary chambers having respectively primary and secondary outlet orifices, the primary and secondary chambers being respectively associated with primary and secondary expansion holes, able to be closed respectively by the primary and secondary pistons.

The method for adjusting the lost motion of the secondary piston comprises the following steps:

placing the pistons and springs in the bore
leaving the primary piston in contact with its rest stop
moving the secondary piston until it closes the secondary expansion hole
detecting the closure of the secondary expansion hole
moving the secondary piston until the secondary expansion hole just reopens
detecting the reopeing of the expansion hole
setting the maximum separation.

7 Claims, 1 Drawing Sheet

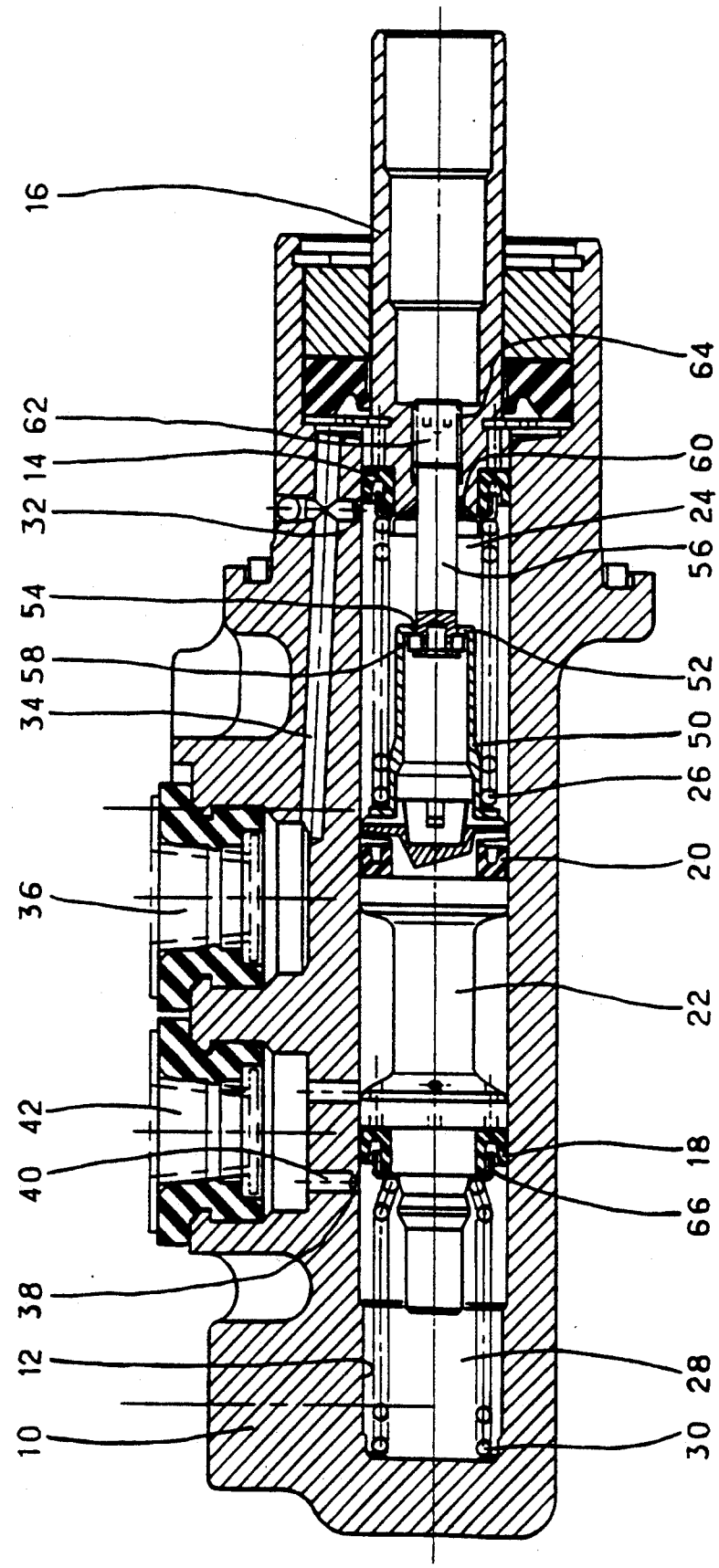

METHOD FOR ADJUSTING THE LOST MOTION IN A TANDEM MASTER CYLINDER AND TANDEM MASTER CYLINDER FOR CARRYING OUT THIS METHOD

BACKGROUND OF THE INVENTION

The present invention concerns tandem master cylinders, in particular those destined to equip hydraulic brake circuits of motor vehicles, and it concerns more particularly a method of adjusting these to reduce their lost motion.

A conventional tandem master cylinder comprises a primary piston and a secondary piston sealingly sliding in a bore in order to define therein two pressure chambers each supplying a hydraulic circuit during the operation of the primary piston. A spring is placed in each pressure chamber.

Conventionally the preload of the primary spring is greater than that of the secondary spring and the length of the primary spring is limited in extension.

Each of the pressure chambers is supplied with low pressure fluid, on the one hand by a first orifice connecting a low pressure fluid reservoir to the corresponding chamber via a non-return type sealing ring, as well as by a second orifice called an expansion hole, of smaller size and positioned to be closed when the piston moves.

By way of convention, the elements closer to the brake pedal will be called primary and the elements further away will be called secondary.

During the operation of such a master cylinder, either by the push rod of a brake-booster, or directly by the brake pedal, initially the force exerted on the primary piston has the effect of equalizing the preload of the spring associated with the secondary piston and overcoming friction due to the sealing rings. In this first phase of operation of the master cylinder, the force exerted on the primary piston does not engender any hydraulic pressure in a brake circuit. Next, the force exerted on the primary piston continues to move forward the secondary piston whose movement permits closing the expansion hole. At that moment, the hydraulic pressure in the secondary circuit starts to rise and the corresponding piston therefore presents resistance to its advance.

This causes compression of the primary spring; the primary expansion hole having been closed at the beginning of the stroke by the primary piston, the hydraulic pressure increases in the corresponding chamber.

The lost motion that it is desired to adjust here is the distance that the secondary piston has to be moved to close the secondary expansion hole.

Depending on the manufacturing tolerances of the various elements comprising the master cylinder, it will be seen therefore that the lost motion can vary during a production run. In addition, in order to obtain braking action as rapidly as possible after beginning the operation of the master cylinder, it is desirable that its lost motion should be as little as possible.

A complicated method for adjustment of the lost motion of a master cylinder by inserting a spacer and adjusting the length of an adjusting screw is known from DE-A-38 19737. This method presents many disadvantages which make it impracticable, such as the need to adjust the lost motion of the secondary piston after having disassembled the master cylinder and before replacing the pistons and springs in the cylinder. This therefore results in an imprecise adjustment which is carried out in accordance with theoretical calculations and which cannot take into account the actual position of the secondary expansion hole and the various manufacturing tolerances. It also results in unreasonable manufacturing costs.

However, as described above, it is the lost motion of the secondary piston which it is necessary to minimize accurately because the stroke of the primary piston is clearly greater than that of the secondary piston, and because the pressure in the primary chamber cannot rise while the secondary expansion hole is open.

SUMMARY OF THE INVENTION

The present invention therefore has the object of providing a method for adjusting the lost motion of the secondary piston of a master cylinder that is simple and rapid to carry out, reliably and with little effort, and which in addition can be applied to a master cylinder without the need for its disassembly.

To this end, the invention provides a method for adjusting the lost motion of the secondary piston of a tandem master cylinder, the tandem master cylinder comprising, in a bore, a primary piston defining with a secondary piston a primary chamber, the secondary piston defining with the bottom of the bore a secondary chamber, the primary and secondary chambers having respectively primary and secondary outlet orifices, the primary and secondary chambers being respectively associated with primary and secondary expansion holes, able to be closed respectively by the primary and secondary pistons, the face of the secondary piston opposite the primary chamber cooperating with a sleeve in which a rod solidly attached to the primary piston and carrying a stop washer slides freely, a primary spring maintaining the separation one from the other of the primary and secondary pistons whose maximum separation is limited by said stop washer, and a secondary spring urging to the rest position the primary and secondary pistons and presenting a preload at rest less than that of the primary spring.

The method comprises the following steps:
placing the pistons and springs in the bore
leaving the primary piston in contact with its rest stop
moving the secondary piston until it closes the secondary expansion hole
detecting the closure of the secondary expansion hole
moving the secondary piston until the secondary expansion hole just reopens
detecting the reopening of the expansion hole
setting the maximum separation Preferably, detecting the opening or closing of the secondary expansion hole is carried out by injecting into the secondary chamber a fluid under pressure, such as air, through the pressurized hydraulic fluid outlet orifice and by checking the passage of this fluid through the expansion hole.

In order to carry out the method described above, a threaded orifice is made all the way through the primary piston, and the end of the abovementioned threaded rod cooperates with the thread of this orifice and is accessible from outside the master cylinder in order to enable the adjustment of the maximum separation of the two pistons.

A further subject of the present invention is a tandem master cylinder especially designed for carrying out this method, which cylinder is of simple and reliable design and has minimal lost motion.

To this end, the invention provides a tandem master cylinder comprising, in a bore, a primary piston defining with a secondary piston a primary chamber, and comprising means for adjusting the maximum separation between the primary piston and the secondary piston from outside the master cylinder.

Owing to such a master cylinder, it is possible to take into account manufacturing tolerances in order to reduce the lost motion in the master cylinder.

BRIEF DESCRIPTION OF THE DRAWINGS

One method of carrying out the invention will now be described by way of entirely non-limiting example reference being made to the accompanying drawing in which:

the sole figure is a lateral view in longitudinal section of a tandem master cylinder utilizing the method according to the present invention.

DETAILED DESCRIPTION OF THE INVENTION

The figure shows a master cylinder produced according to the invention. By way of convention, the direction in which the pieces move during operation of the master cylinder is called "forward" and the direction in which the pieces move on returning to their rest position is called "rearward". In the figure forward is to the left and rearward is to the right. The primary circuit is therefore to the right of the figure, and the secondary circuit to the left.

The master cylinder of the figure is made up of a body 10 in which there is produced a blind bore 12 in which a primary piston 16 slides sealingly owing to a ring 14. Also in the bore a secondary piston 22 slides sealingly owing to a ring 18 and a seal 20. The space delimited in the bore 12 between the primary piston 16 and the secondary piston 22 defines a primary chamber 24, a primary spring 26 being placed between the primary and secondary pistons. The space delimited by the bottom of the blind bore 12 and the secondary piston defines a secondary chamber 28 in which a secondary spring 30 is placed.

The primary chamber 24 is connected to a primary brake circuit (not shown) by a primary exit orifice (not shown). Similarly the secondary chamber 28 is connected to a secondary brake circuit (not shown) by a secondary exit orifice (not shown).

When the master cylinder is in its rest position, the primary chamber 24 communicates with a brake fluid reservoir (not shown) by a primary expansion hole 32, a drilling 34 and an orifice 36, while the secondary chamber 28 communicates with the reservoir by a secondary expansion hole 38, a drilling 40 and an orifice 42.

When the master cylinder is operated by applying a force to the primary piston 16, the two pistons first move simultaneously because of the primary spring 26 presenting a preload at rest greater than that of the secondary spring 30, and the rings 14 and 18 come to cover the expansion holes 32 and 38 respectively. The increasing pressure in the secondary chamber 28 therefore opposes the advance of the secondary piston 22, which has the effect of compressing the primary spring 26 and increasing the pressure in the primary chamber 24.

According to the invention, an adjustment method is provided for ensuring this covering of the secondary expansion hole with a minimum stroke of the two pistons.

Situated on the rear face of the secondary piston 22 is a cylindrical sleeve 50 which comes to an end towards the rear in a part 52 which extends radially towards the interior and defines an opening 54 in which a rod 56 solidly attached to the primary piston 16 freely slides. The rod 56 carries at its front end penetrating into the opening 54 a stop washer 58, normally pressing against the shoulder formed by the part 52, owing to the presence of the spring 26.

The rear end 62 of the rod 56 is externally threaded and is screwed into a threaded orifice 64 that is made all the way through the primary piston. This rear end 62 is therefore accessible from outside the master cylinder. Sealing between the primary piston 16 and the rod 56 is ensured by a seal 60.

It will therefore be understood that by screwing or unscrewing the rod 56 more or less in the primary piston 16, the secondary piston 22 moves further away from or closer to the primary piston 16. It is therefore possible owing to the invention to adjust the maximum separation in the rest position between the two pistons in order to obtain the required covering of the secondary expansion hole with the object of reducing the lost motion of the master cylinder. In addition, it is possible to carry out this adjustment by rotation of the rod 56 controlled from outside the master cylinder in the cavity usually provided at the rear of the primary piston. The rod 56 may for example present a head in the form of a screw head or equivalent.

The method of the invention will now be explained with reference to the figure. First, a fluid under pressure is sent into the secondary chamber 28 through its exit orifice.

At this moment, with the aid of an appropriate tool introduced from the rear into the cavity of the primary piston, as aforesaid, the rod 56 is turned to let the secondary piston in its turn advance under the effect of the primary spring 26 which presents in the rest position a preload greater than that of the secondary spring 30 until the ring 18 comes to cover the secondary expansion hole 38.

Detecting the covering of the secondary expansion hole may be carried out by numerous means. For example the fluid under pressure injected into the secondary chamber may be gaseous or hydraulic. Detecting the covering of the expansion hole is carried out very easily, for example, by detecting the stopping of the flow of this fluid through the orifice 42 or by detecting the rise in pressure in the secondary chamber indicating immediately the covering of the secondary expansion hole.

Next the secondary piston is returned by a predetermined distance corresponding to the diameter of the expansion hole by turning the rod 56 in the reverse direction, in order to reopen the expansion hole 38 by the required amount.

The rod 56 can therefore be prevented from rotating with respect to the primary piston by any means: a nut screwed onto this rod if it extends into the cavity situated at the rear of the primary piston, this nut thus acting as a lock nut, or using for the threads of the rod 56 and of the primary piston 16 self-locking or self-braking systems.

After these operations, it is thus ensured that the covering of the secondary expansion hole will occur in a manner such that the lost motion of the secondary piston will be reduced to its minimum. This implies that the ring 18 rests perfectly in place in the piston, in the rest position, even if the secondary chamber has previously been subjected to a vacuum, which is attained with the help of the cup 66. Of course, other methods well known to a person skilled in the art may be used to reduce the lost motion of the master cylinder relative to the primary circuit, even though this is not absolutely necessary.

A master cylinder has thus been produced, according to the invention, whose lost motion can be adjusted at will after assembly and this according to a method which is particularly simple to apply, without the necessity of dismantling this master cylinder in order to carry out the adjustment and reassembling it afterwards, and accordingly with an obvious saving in time and cost. In addition, owing to its simplicity, the method for adjustment that has just been described can easily be carried out automatically and robotically in a production line with individual checking of each piece produced.

Of course, the invention is not limited to the embodiment that has just been described, but is capable of receiving numerous modifications that will be apparent to a person skilled in the art and which are within its scope. Thus, for example, the invention can be applied to other types of master cylinders. Likewise, the invention is applicable equally well to master cylinders controlled by a booster as well as those directly controlled by the brake pedal.

What we claim is:

1. A method for adjusting the lost motion in a tandem master cylinder, the tandem master cylinder comprising, in a bore, a primary piston defining with a secondary piston a primary chamber, the secondary piston defining with a bottom of the bore a secondary chamber, the primary and secondary chambers having respectively primary and secondary outlet orifices and orifices for connection to a reservoir, the primary and secondary chambers being respectively associated with primary and secondary expansion holes able to be closed respectively by the primary and secondary pistons, a face of the secondary piston opposite the primary chamber cooperating with a sleeve in which a threaded rod connected with the primary piston and carrying a stop washer slides freely, a primary spring maintaining a separation of said primary and secondary pistons and having a maximum separation limited by said stop washer engaging said sleeve, and a secondary spring urging to a rest position said primary and secondary pistons and having a preload at rest less than that of the primary spring, said method comprising the following steps for adjusting said lost motion while both pistons are located in said bore;

placing said pistons and springs in the bore,
 leaving said primary piston in contact with a rest stop,
 moving the secondary piston until the secondary piston closes the secondary expansion hole,
 detecting the closure of the secondary expansion hole,
 moving the secondary piston until the secondary expansion hole just reopens,
 detecting the reopening of said secondary expansion hole, and
 fixing the threaded rod to the primary piston while the pistons are located in said bore in order to adjustably minimize the lost motion at said maximum separation.

2. The method according to claim 1, wherein either one of the steps of detecting the closing and reopening of the secondary expansion hole is carried out by injecting into the secondary chamber a fluid under pressure, through an orifice other than said secondary expansion hole, and by checking the passage of the fluid through said secondary expansion hole.

3. The method according to claim 2, wherein said fluid is a gas under pressure.

4. The method according to claim 1, wherein the secondary piston is moved under the effect of said primary spring and of the rotation of said threaded rod screwed into the primary piston.

5. A tandem master cylinder for carrying out the method according to claim 1, comprising means for varying the maximum separation between the primary and secondary pistons from outside said master cylinder.

6. The tandem master cylinder according to claim 5, wherein a threaded orifice extends through the primary piston, and an end of said threaded rod cooperates with the thread of said threaded orifice and is accessible from outside the master cylinder for assuring an adjustment of said maximum separation.

7. The tandem master cylinder according to claim 6, wherein a seal is placed between said rod and said primary piston.

* * * * *